United States Patent Office 3,055,966
Patented Sept. 25, 1962

3,055,966
MICROPOROUS MATERIAL SEPARATOR AND
METHOD OF MAKING SEPARATOR
Erik Gustav Sundberg, Nol, Sweden, assignor to Aktiebolaget Tudor, Stockholm, Sweden, a corporation of Sweden
No Drawing. Filed Dec. 17, 1959, Ser. No. 860,111
Claims priority, application Sweden Dec. 20, 1958
10 Claims. (Cl. 136—146)

This invention relates to microporous plates and more particularly to such plates which may be adventageously used as separators or diaphragms between the electrodes of electric batteries or accumulators.

One requisite of a separator for an electric accumulator is a high degree of microporosity to allow diffusion of the electrolyte and free movement of ions. The pore size of the separator must be small enough to prevent conductive particles from the electrode plates from penetrating the separators and in that way causing shortcircuiting between said electrode plates.

Other requisites are low, uniform and unchangeable electrical resistance, good chemical resistance against the powerful oxidizing attacks to which separators in electric accumulators are exposed during excessive rates of charge and discharge, and sufficient strength and toughness to withstand handling and to maintain the shape of the separator when wet.

The surface of a microporous sheet suitable as a separator between electrode plates in an electric accumulator should have a low friction coefficient and a good wearing resistance and solidity in order not to become destroyed through movement of the electrodes relative the separators. Such a movement, though with small amplitude, occurs especially in batteries for traction type vehicles. Additionally, increasing mechanical pressure is applied to separators when tightly assembled in an accumulator cell together with electrodes in consequence of the growing thickness of the latter during service.

The provision of satisfactory separators for electric accumulators presents increasing problems primarily due to recent advancements in the battery art. Wood separators, which earlier have been successfully employed, are in many cases unsuitable today because this type of separator cannot be stored in dry condition and consequently cannot be used in so-called dry charged batteries. Moreover, some ingredients in present day batteries, which are found either in the electrolyte or in the active material, have been found to cause disintegration of cellulose material previously used as separators.

Microporous rubber separators have also been used to some extent in the battery art. Such separators, however, have been found to be relatively fragile and inflexible and, additionally, show only poor wearing resistance.

Separators consisting of cellulose fibers and impregnated with different resins have also been used, but they have poor porosity in consequence of which the internal electric resistance of a battery cell equipped with that type of separator is undersirably high.

In recent years, separators made from different suitable resinous materials have been tried. Also, many attempts have been made to use polyvinylchloride as a material for separators; however, the risk of chloride poisoning from the batteries has prevented its wide acceptance for general use. This previously used synthetic material has, however, been of a polar type material which is less desirable because of the fact that the condition of polar substances is influenced by the ion flow, which causes a change in the conductive resistance of said material. In a storage battery, during charging, the electric current passes in one direction and in the opposite direction during discharging, in consequence of which the above said change in electric resistance arises. Suitable separators should not only have a low, but also a constant or uniform resistance in both directions.

It is therefore an object of the present invention to provide a separator and a method for production thereof, which will be of high microporosity, low and unchangeable internal resistance and yet contains pores of such a smallness as to mechanically screen metallic particles from the active material of the plate of one polarity from another of opposite polarity.

Another object of the invention is to provide a separator that will have sufficient mechanical strength to maintain shape during handling and when in a wet condition.

It is a further object of the invention to provide a separator of the type described above that is highly resistant to the oxidizing condition in a storage battery.

It is a still further object of the invention to provide an improved method for the production of separators and diaphragms for electric storage batteries and also for the production of microporous sheet like material suitable for making these separators.

Further objects will be apparent to those skilled in the art from the following description and from the appended claims.

The microporous sheet material of this invention is made of a non-polar polyolefine which is treated with an inorganic salt, a swellable material, and a leaching liquid to provide the microporosity.

The non-polar compounds have straight molecule chains and are known as straight linked materials. Due to its molecular construction such material is smooth and separators made from such material have a low friction coefficient, which in turn reduces the friction between electrodes and separators. Polyethylene, polypropylene, polybutylene and other polyolefines are examples of the different kinds of non-polar materials that may be used. The inorganic salt used may be sodium sulphate, potassium sulphate, aluminum sulphate, or magnesium sulphate. The swellable material may be starch, for example, and the leaching liquid may be water or a suitable acid or lye depending on what salts and what swellable material are added to the polyolefine.

In a preferred embodiment of the present invention, a microporous sheet material is made of 5 to 35% microporous polyethylene, 45 to 85% inorganic material, and 1 to 20% starch. It is important that the amount of inorganic salt be considerably larger than the amount of organic expandable material. A specific example of the composition is as follows:

| | Percent |
|---|---|
| Polyethylene | 12 |
| Sodium sulphate | 78 |
| Starch | 10 |

In the first step of the process the polyethylene is pulverized and mixed with a levigated inorganic salt such as sodium sulphate. Next a small amount of starch which swells in a liquid is mixed in. In the mixture of fine particles, the amount of leachable material is smaller than the amount of the inorganic salt. Said inorganic material constitutes mainly the pore former while the advantage of said organic expandable material is that the leaching of said inorganic salt is facilitated when the material is brought into the form of a sheet and in this form has been stabilized. Consequently, the main purpose of said organic material is not to serve as a pore former in itself, but to facilitate leaching of the inorganic salt. After the pulverized ingredients have been mixed to homogeneity, they are compressed into a flattened out shape in a so-called calendar roller mill to the desired form.

Preferably, the mix in powder form is first passed through heating rollers at which time the polyethylene is at least partially melted and sinters together, whereupon the resulting mat passes through cold rollers and there takes on its definitive thickness and stabilizes in the desired dimension.

Next, the material is exposed to a leaching process in which the organic material, starch, swells and thereby facilitates the solution of the inorganic salt in water, for example. Thereafter, the material may be dried and cut into the desired shape. If desired, the material may be treated with sulphuric acid or the like to decompose and leach the starch out before drying.

The microporous polyethylene sheet thus formed is suitable as a separator material owing to its resistance against oxidizing attacks. Further, since the material has a low friction coefficient, a thorough wearing is not to be apprehended, due to the friction between electrode plates and separators. Moreover, a separator in accordance with the present invention is flexible, has a high solidity, and its raw material costs and cost of production are low. Also characteristic of the separator is the fact that active particles that may come from the electrode plates will not stick to its surface. In that way, the porosity of said separator is not reduced, and therefore an advantageous result is obtained with respect to the internal resistance and capacity of a storage battery cell. Further, through the treatment of calendering, an orientation of the molecule chains in the plane of the produced sheet is obtained, thereby improving the mechanical stability and friction coefficient. Sometimes it may be advantageous to undertake a pre-orientation of the molecule chains in the material by extrusion, and to use said pre-oriented materials as initial material when calendering to sheet shape.

The leaching procedures may also be varied as appears suitable with respect to the composition of the material mixture and the salts in said mixture. Sometimes it may be advantageous to undertake the leaching procedure or a part of it during the electrolysis, at which time the sheet material passes between electrodes in a suitable electrolyte, in order to hasten the redeeming of said inorganic salt.

According to another method of production, the mixture of material of powdered or pulverized material is distributed in a layer of even thickness to a belt or the like and is brought to sinter together so that a relatively thick and a loosely joined mat is formed, which by rolling, preferably during influence of heat, is reduced to the desired thickness and is stabilized, as by cold rolling. Instead of rolling, one or more pressure procedures, as by plane plates, may be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of manufacturing a microporous partition wall for use between electrodes in an electric storage battery comprising the steps of mixing a resinous polyolefine polymer material together with an inorganic salt and a swellable material, subjecting said mixture to conditions sufficient to cause said inorganic salt to form pores in said polymer material, and leaching the remnants of said inorganic salt from said mixture, said salt remnants being made readily accessible to the leaching liquid by the swelling of said swellable material.

2. A method of manufacturing a microporous partition wall for use between electrodes in an electric storage battery comprising the steps of mixing resinous polyolefine polymer material together with an inorganic salt and a swellable material, treating said mixture until the resinous particles are sintered together, bringing the sintered mass into sheet form, and leaching the remnants of said inorganic salt from said mixture, the swellable material enlarging during said leaching to facilitate removal of said inorganic salt.

3. A method of manufacturing a microporous partition wall for use between electrodes in an electric storage battery comprising the steps of mixing resinous polyolefine polymer material together with an inorganic salt and a swellable material, forming said mixture into sheet form, and treating the sheet-like body in a liquid until the swellable material swells and the inorganic salt is dissolved.

4. A method of making a microporous non-polar polyolefine storage battery electrode partition wall comprising the steps of mixing an inorganic salt and a swellable material with polyolefine to form a substantially homogeneous mixture, forming said mixture into a sheet-like body, and treating said body with a leaching liquid, said inorganic salt forming pores in said polyolefine material and said swellable material swelling sufficiently to enable said salt to be removed from said mixture after said pore formation.

5. A method as defined in claim 4 wherein said swellable material is starch.

6. In a method of manufacturing a microporous material from a resinous thermoplastic polymeric material containing a dispersion of particles of an inorganic salt, the step of adding a swellable material to said plastic to enhance leaching of said inorganic salt by swelling sufficiently to render said inorganic salt readily accessible to a leaching liquid.

7. A composition of matter for use in making a microporous material causing about 5 to 35% a resinous thermoplastic polymeric material, 45 to 85% inorganic salt, and about 1 to 20% starch, said starch being added in sufficient amount to facilitate leaching of said inorganic salt from said composition of matter by swelling when exposed to a leaching liquid and thereby rendering said inorganic salt readily accessible to a leaching liquid.

8. A composition of matter for use in making a microporous sheet-like material comprising a non-polar resinous polyolefine polymer, an inorganic salt, and a swellable material capable of swelling upon contact with a solvent liquid when applied to said mixture to leach said inorganic salt from said composition of matter.

9. The composition as defined in claim 8, wherein said polyolefine is selected from the group consisting of polyethylene, polypropylene, and polybutylene.

10. The composition as defined in claim 8, in which the inorganic salt is selected from the group consisting of aluminum sulphate, sodium sulphate, potassium sulphate, and magnesium sulphate.

References Cited in the file of this patent

UNITED STATES PATENTS

| | | |
|---|---|---|
| 2,138,712 | Saffert | Nov. 29, 1938 |
| 2,676,929 | Duddy | Apr. 27, 1954 |